United States Patent
Comeau et al.

(10) Patent No.: US 6,882,457 B1
(45) Date of Patent: Apr. 19, 2005

(54) SYSTEM AND METHOD FOR DETERMINING THE MODULATION QUALITY OF AN ILLUMINATION MODULATOR IN AN IMAGING SYSTEM

(75) Inventors: Bryan Comeau, Atkinson, NH (US); Philip A. Rombult, Boxford, MA (US); Jeffrey Knox, Lynnfield, MA (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 10/650,068

(22) Filed: Aug. 27, 2003

(51) Int. Cl.[7] ............................................. G02B 26/00
(52) U.S. Cl. ..................................... 359/239; 359/237
(58) Field of Search ................................. 359/237–239

(56) References Cited

U.S. PATENT DOCUMENTS

| | | | |
|---|---|---|---|
| 5,072,239 A | 12/1991 | Mitcham | 347/255 |
| 5,081,597 A | 1/1992 | Kowalski | 702/85 |
| 5,323,002 A | 6/1994 | Sampsell | 250/252.1 |
| 5,842,088 A | 11/1998 | Thompson | 399/177 |
| 6,188,427 B1 | 2/2001 | Anderson et al. | 347/255 |
| 6,369,936 B1 | 4/2002 | Moulin | 359/323 |
| 6,414,706 B1 | 7/2002 | Allen | 347/239 |
| 6,479,811 B1 | 11/2002 | Kruschwitz | 250/237 |
| 6,650,353 B1 | 11/2003 | Comeau | 347/239 |
| 2002/0196245 A1 | 12/2002 | Markis | 345/208 |
| 2003/0043445 A1 * | 3/2003 | Miller et al. | 359/237 |

FOREIGN PATENT DOCUMENTS

| | | |
|---|---|---|
| EP | 437766 A2 | 7/1991 |
| EP | 1069759 | 1/2001 |
| EP | 0791863 | 10/2001 |
| EP | 1293348 | 3/2003 |
| WO | WO 91/15843 | 10/1991 |
| WO | WO 00/69631 | 11/2000 |

* cited by examiner

*Primary Examiner*—Georgia Epps
*Assistant Examiner*—M. Hasan
(74) *Attorney, Agent, or Firm*—William Hilton; Robert A. Sabourin

(57) ABSTRACT

A modulation quality detection system is disclosed for determining the modulation quality of an illumination modulator in an imaging system. The modulation quality detection system includes a modulator adjustment unit for providing a test pattern on the illumination modulator, a detector for receiving a modulated illumination field from the illumination modulator, a sampling unit for determining at least three sample values (A, B and C) for each of three areas of the modulated illumination field respectively, and an evaluation unit for determining whether the value $$\left(\frac{A+C}{2}\right) - B$$

is greater than a threshold value.

15 Claims, 3 Drawing Sheets

SYSTEM AND METHOD FOR DETERMINING THE MODULATION QUALITY OF AN ILLUMINATION MODULATOR IN AN IMAGING SYSTEM

BACKGROUND

The invention generally relates to imaging systems, and relates in particular to imaging systems that employ an illumination modulator.

Imaging system such as those disclosed in U.S. Pat. No. 6,433,934, may include an illumination source, a field lens system, an illumination modulator, imaging optics and an imaging surface. During imaging, the field lens system directs the illumination field onto the light modulator and the light modulator reflects the illumination field toward the imaging surface in one mode and reflects the illumination field away from the imaging surface in another mode. For example, the modulator may include a Grating Light Valve (GLV) as sold by Silicon Light Machines of Sunnyvale, Calif., and the system may direct via the imaging optics either the zero order reflection or the first order reflection toward the imaging surface in various embodiments.

Many imaging systems employ an illumination field that is generally in the shape of a line of illumination, permitting a line of picture elements (or pixels) to be imaged simultaneously. It has been discovered, however, that the performance of certain modulators may change over time, which may cause detrimental effects to the overall system.

U.S. Pat. No. 6,479,811 discloses a system and method for calibrating an illumination modulator that involves sensing illumination from a non-imaging order (e.g., $+1^{st}$ order as shown in FIGS. 7 and 8) at a segmented detector 76. Although such as a system may be employed during imaging, additional optics and control equipment are required for such a system.

There is a need, therefore, for a system and method for efficiently and economically determining whether the performance of a light modulator has changed.

SUMMARY

The invention provides modulation quality detection system for determining the modulation quality of an illumination modulator in an imaging system. In accordance with an embodiment, the system includes a modulator adjustment unit for providing a test pattern on the illumination modulator, a detector for receiving a modulated illumination field from the illumination modulator, a sampling unit for determining at least three sample values (A, B and C) for each of three areas of the modulated illumination field respectively, and an evaluation unit for determining whether the value $$\left(\frac{A+C}{2}\right) - B$$

is greater than a threshold value.

BRIEF DESCRIPTION OF THE ILLUSTRATED EMBODIMENTS

The following description may be further understood with reference to the accompanying drawings in which.

The drawings are shown for illustrative purposes only and are not to scale.

DETAILED DESCRIPTION OF THE ILLUSTRATED EMBODIMENTS

Figure 1:
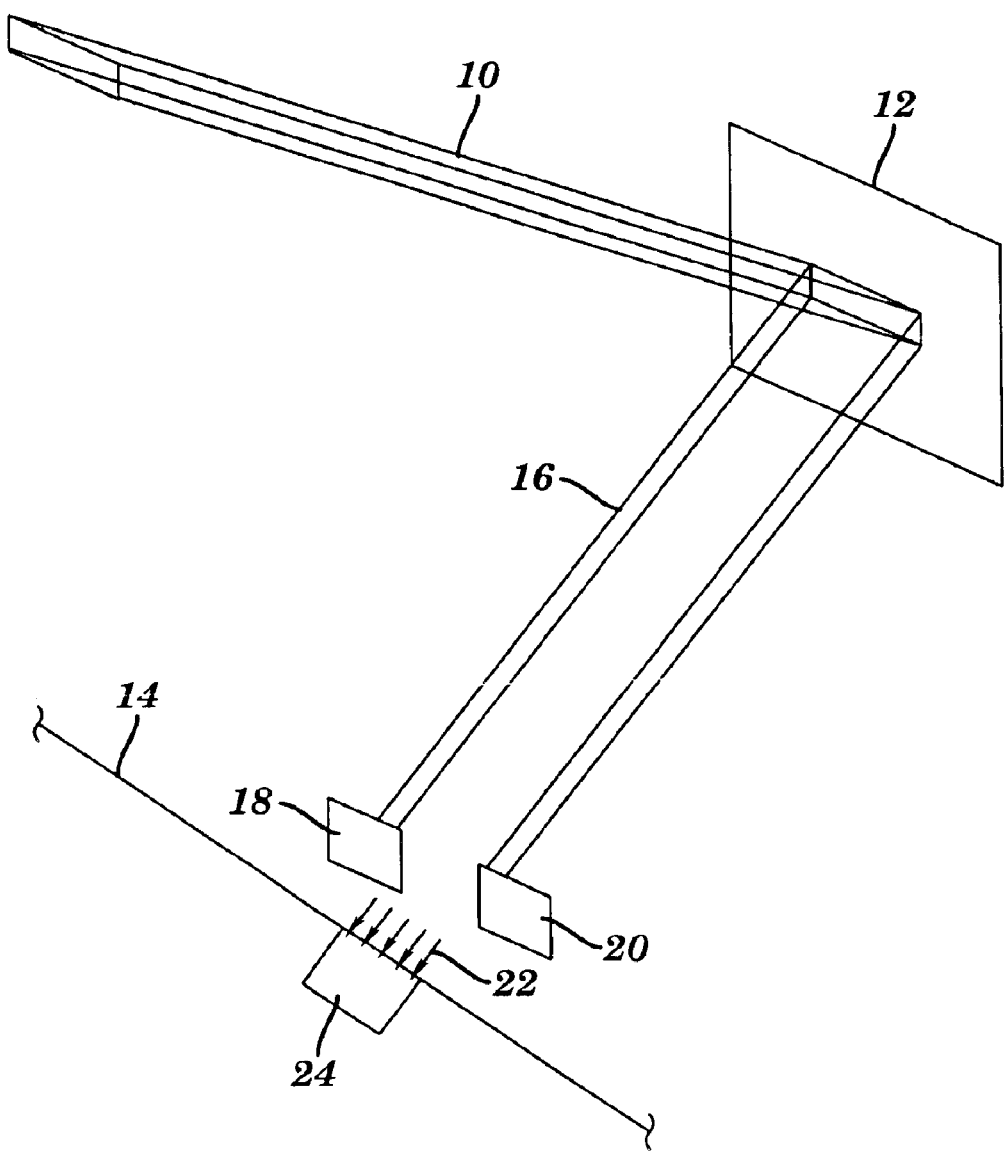
FIG. 1 shows an illustrative diagrammatic view of an imaging system employing a modulation quality detection system in accordance with an embodiment of the invention.

As shown in FIG. 1, an imaging system (e.g., a thermal imaging system) in accordance with an embodiment of the invention may include an illumination field 10, an illumination modulator 12 and an imaging surface 14 (e.g., an external imaging drum). The modulator receives the illumination field 10 via a field lens system (not shown) and directs a modulated illumination field 16 toward the imaging surface via imaging optics (not shown). The illumination source, field lens system, modulator, imaging optics and imaging surface may be as disclosed in U.S. Pat. No. 6,433,934, the disclosure of which is hereby incorporated by reference. The modulator may include a Grating Light Valve (GLV) as sold by Silicon Light Machines of Sunnyvale, Calif.

The system also includes a pair of block plates 18 and 20 that prevent the endmost portions of the illumination field from reaching the imaging surface during normal scanning while permitting the central portion 22 of the modulated illumination field 16 to reach the imaging surface during zero order imaging. A detector 24 is also placed at the image plane of the imaging surface adjacent imagable media.

During use a modulated illumination field may be defined by non-modulated areas on either side of the modulated field. For example, in a zero order imaging system, the non-modulated areas are formed by activating the associated portions of the light modulator to deflect the incident light into the +/−first orders etc. The off states may become mis-calibrated or otherwise incorrect over time, for example, due to charge build-up on the ribbons of the light modulator.

Figure 2:
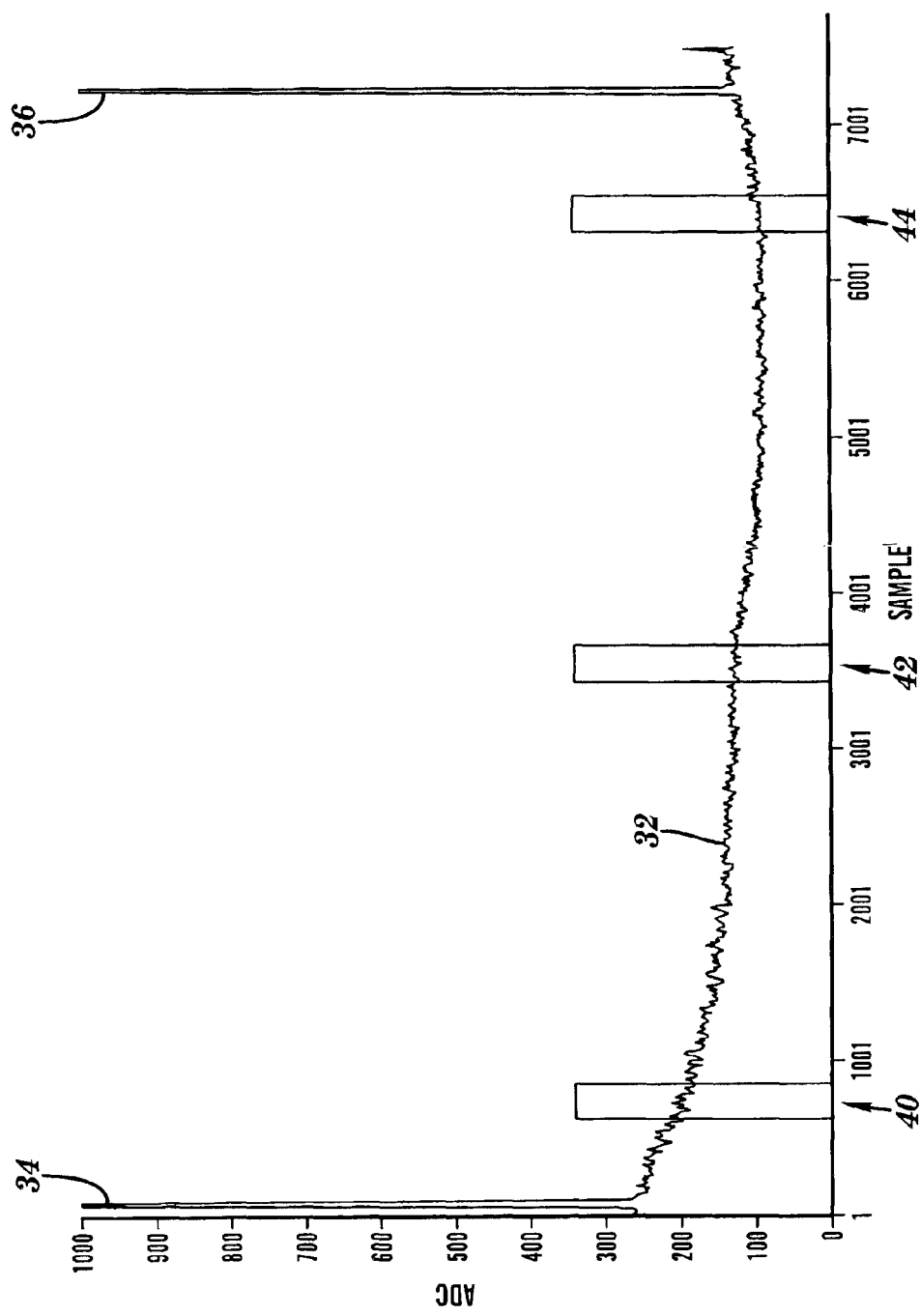
FIG. 2 shows an illustrative graphical representation of a scan image with three sample regions in a modulator test pattern in accordance with an embodiment.

A modulation quality detection pattern is provided in the modulator that causes a pair of shutters at either end of the modulator to provide imaging, while the remaining shutters are all off. During a single scan in a slow scan direction (e.g., along the longitudinal length of imaging surface), the detector (e.g., having a slit opening of about 10 microns), may receive an illumination field as shown at 32 in FIG. 2. The illumination field includes two high intensity spikes 34 and 36 at the ends of the modulated illumination field. The detector 24 is moved across the entire field 16 during charge build-up detection scan. In accordance with an embodiment, samples are taken at three defined periods as shown at 40, 42 and 44. The end most sample areas are preferably located within about 20% and more preferably about 15% of the distance from each of the ends of the modulated illumination field. During each of these sample periods, 100 samples are taken and analyzed (about 10 samples per GLV shutter), and the average sample value for each period is then determined. For example, the average value for the sample period 40 may be designated as average sample A, and the average value for the sample period 42 may be designated as average sample B, and the average value for the sample period 44 may be designated as average sample C. The system may determine whether the ends of the illumination field 32 are too high (due to charge build-up) by comparing A, B and C. For example, the system may take the average of A and C, and then evaluate the difference between that average and B.

Figure 3:
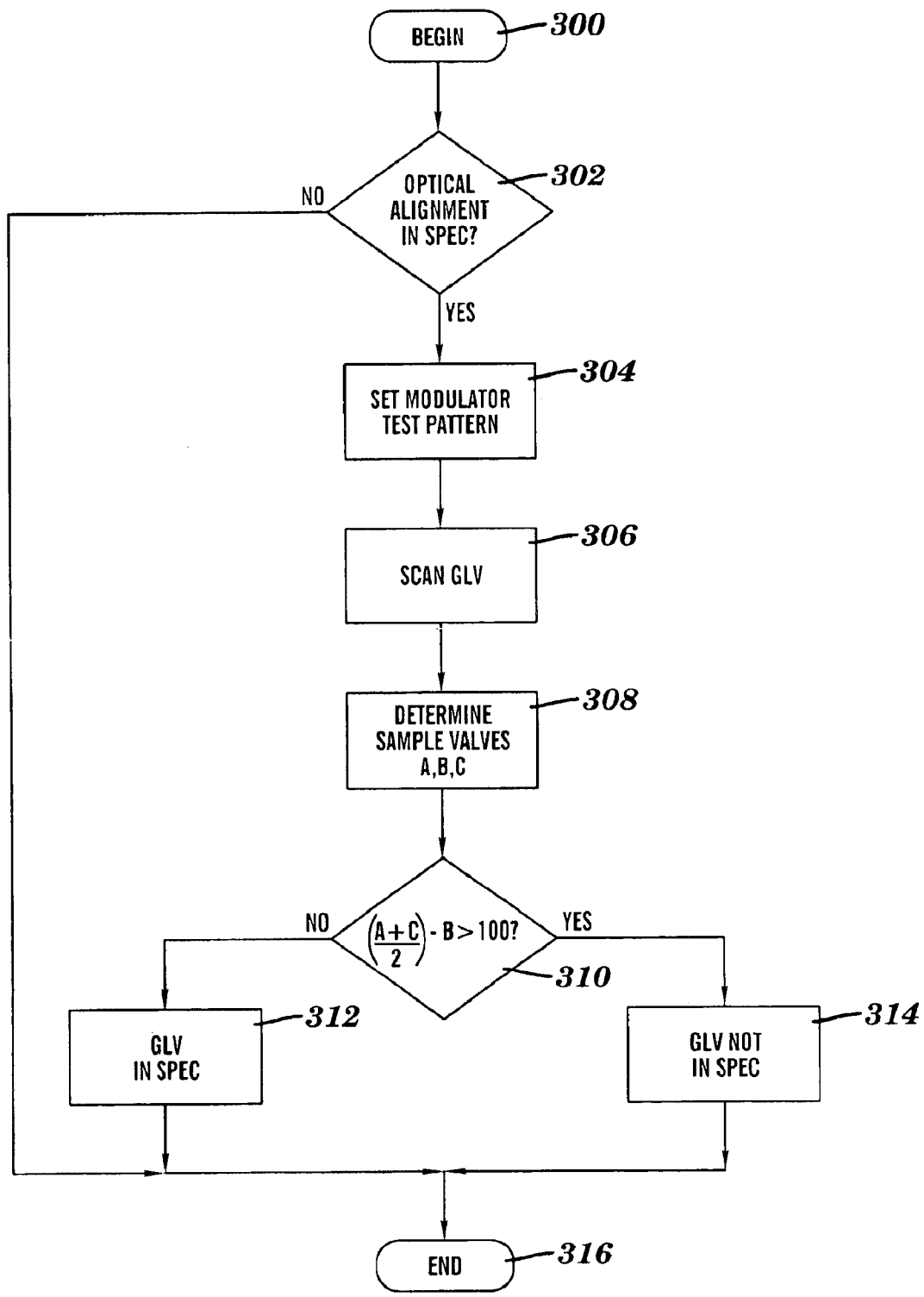
FIG. 3 shows an illustrative diagrammatic view of a process in accordance with an embodiment of the invention.

In particular and as shown in FIG. 3, a process in accordance with an embodiment of the invention may begin (step 300) by determining whether optical alignment is within other parameters of the specification (step 302), including for example, whether the illumination field is level with respect to the modulator. If not, the process ends (step 316). If so, the process then sets the modulator to provide two shutters on at each end of the modulator (step 304). The process then scans the GLV (step 306) and calculates the data points in three regions and determines the average value (A, B and C) for the respective regions (step 308). The process then determines (step 310) whether the following relationship exists:

$$\left(\frac{A+C}{2}\right) - B > 100$$

If the above relationship does not exist, then the process records that the GLV is within specification (step 312) and ends (step 316). If the above relationship does exist, then the process records that the GLV is not within specification because a charge build-up has occurred (step 314) and ends (step 316). In various embodiments, the process may then return to the beginning (step 300).

If the system determines that a charge build-up has occurred, then the system may hold down all of the shutters with a voltage potential that is equal and opposite to the value that is used during imaging. Preferably, the system also records the amount of time that the shutters are used during imaging and applies the opposite potential for an equivalent amount of time.

Those skilled in the art will appreciate that numerous modifications and variations may be made to the above disclosed embodiments without departing from the spirit and scope of the invention.

What is claimed is:

1. A modulation quality detection system for determining the modulation quality of an illumination modulator in an imaging system, said modulation quality detection system comprising:

modulator adjustment means for providing a test pattern on the illumination modulator;

a detector for receiving a modulated illumination field from said illumination modulator;

sampling means for determining at least three sample values (A, B and C) for each of three areas of said modulated illumination field respectively; and evaluation means for determining whether the value $$\left(\frac{A+C}{2}\right) - B$$

is greater than a threshold value.

2. The modulation quality detection system as claimed in claim 1, wherein said sample values A and C are for areas that are within about 20% of each end of the modulated illumination field.

3. The modulation quality detection system as claimed in claim 1, wherein said imaging system provides zero order imaging.

4. The modulation quality detection system as claimed in claim 1, wherein each of said sample values (A, B and C) is provided by an average of about, 100 sample values.

5. The modulation quality detection system as claimed in claim 1, wherein said illumination modulator includes a grating light valve and said test pattern on said illumination modulator provides two shutters on at each end of the illumination modulator.

6. A modulation quality detection system for determining the modulation quality of an illumination modulator in an imaging system, said modulation quality detection system comprising:

modulator adjustment means for providing a test pattern on the illumination modulator;

a detector for receiving a modulated illumination field from said illumination modulator;

sampling means for determining at least three sample values (A, B and C) for each of first, second and third areas of said modulated illumination field respectively wherein said first and third areas are each within about 20% of an end of said modulated illumination field; and evaluation means for determining whether a quality of said modulated illumination field is within a defined standard.

7. The modulation quality detection system as claimed in claim 6, wherein said first and third areas are within about 15% of each end of the modulated illumination field.

8. The modulation quality detection system as claimed in claim 7, wherein said imaging system provides zero order imaging.

9. The modulation quality detection system as claimed in claim 7, wherein each of said sample values (A, B and C) is provided by an average of about 100 sample values.

10. The modulation quality detection system as claimed in claim 7, wherein said illumination modulator includes a grating light valve and said test pattern on said illumination modulator provides two shutters on at each end of the illumination modulator.

11. A method of determining the modulation quality of an illumination modulator in an imaging system, said method comprising the steps of:

providing a test pattern on the illumination modulator;

receiving a modulated illumination field from said illumination modulator;

determining at least three sample values (A, B and C) for each of three areas of said modulated illumination field respectively; and determining whether the value $$\left(\frac{A+C}{2}\right) - B$$

is greater than a threshold value.

12. The method as claimed in claim 11, wherein said sample values A and C are for areas that are within about 20% of each end of the modulated illumination field.

13. The method as claimed in claim 11, wherein said imaging system provides zero order imaging.

14. The method as claimed in claim 11, wherein each of said sample values (A, B and C) is provided by an average of about 100 sample values.

15. The method as claimed in claim 11, wherein said illumination modulator includes a grating light valve and said test pattern on said illumination modulator provides two shutters on at each end of the illumination modulator.

* * * * *